United States Patent
Klein (10) Patent No.: US 7,376,427 B2
(45) Date of Patent: May 20, 2008

(54) METHODS AND APPARATUS FOR RESOURCE MANAGEMENT IN INTEGRATED WIRELESS DATA AND VOICE COMMUNICATIONS

(75) Inventor: Thierry E. Klein, Westfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 894 days.

(21) Appl. No.: 10/242,132

(22) Filed: Sep. 12, 2002

(65) Prior Publication Data

US 2004/0053574 A1    Mar. 18, 2004

(51) Int. Cl.
*H04Q 7/20* (2006.01)

(52) U.S. Cl. ............... 455/452.2; 455/450; 455/453

(58) Field of Classification Search ............ 455/67.11, 455/450, 522, 451, 452.1, 452.2, 463, 464, 455/453; 370/229, 230, 328, 329, 345
See application file for complete search history.

(56) References Cited

U.S. PATENT DOCUMENTS

| | | | |
|---|---|---|---|
| 6,816,507 B1* | 11/2004 | Jarbot et al. ............... | 370/465 |
| 7,047,016 B2* | 5/2006 | Walton et al. ........... | 455/452.1 |
| 2002/0177447 A1* | 11/2002 | Walton et al. .............. | 455/452 |
| 2003/0043732 A1* | 3/2003 | Walton et al. .............. | 370/208 |
| 2003/0112880 A1* | 6/2003 | Walton et al. .............. | 375/260 |

OTHER PUBLICATIONS

Singh et al. (Signal Processing, IEEE Transactions on [see also Acoustics, Speech, and Signal Processing, IEEE Transactions on] vol. 50, Issue: 6, Jun. 2002 pp. 1483-1495).*

* cited by examiner

Primary Examiner—Edward F. Urban
Assistant Examiner—Raymond S. Dean (57) ABSTRACT

Techniques for transmission control in a wireless communication system are described. In a system comprising a plurality of voice and data users, a threshold is set reflecting a minimum gain at which a data user will be allowed to transmit. At each of a plurality of time slots, the circumstances, including the instantaneous gains, of all data users are evaluated and the data user having the highest priority is selected as a candidate for transmission. If the candidate for transmission experiences a gain meeting the gain threshold, the candidate is directed to transmit at a power level inversely proportional to the gain. If the candidate for transmission does not experience a gain meeting the threshold, the candidate is inhibited from transmission.

20 Claims, 6 Drawing Sheets

METHODS AND APPARATUS FOR RESOURCE MANAGEMENT IN INTEGRATED WIRELESS DATA AND VOICE COMMUNICATIONS

FIELD OF THE INVENTION

The present invention relates generally to improvements in wireless telephony. More particularly, the invention relates to techniques for allocating resources in a wireless communication network in order to accommodate voice and data users while maximizing resource usage.

BACKGROUND OF THE INVENTION

As wireless telephony has become more and more prevalent, the ways in which it is used have continued to expand. In recent years, wireless data transmission has increased in popularity and many users wish to be able to use a single wireless telephone, served by a single wireless network, to conduct voice communication or data communication as the need arises. A wireless network offering its users the choice of voice and data communication using the same facilities must be able to simultaneously accommodate voice users and data users. Voice and data users, however, have different needs, constraints and requirements. One particularly important main distinction is that voice users need to maintain a constant rate of communication. Every voice user, while carrying on a conversation, needs to be able to transmit and receive information continuously, maintaining a relatively constant communication rate. Data users, who in the context of this application will be classified as users who are not operating in real time and who are using delay-tolerant applications such as email, file transfer, web browsing or data synchronization applications, can tolerate delay and can easily sacrifice continuous communication in order to maximize the average communication rate, or throughput, achieved. Real-time applications such as audio or video have constraints and requirements that are very similar to those of voice users. All voice users need to be able to transmit all the time, while data users can tolerate being periodically inhibited from transmitting in order to allow the most efficient use of the transmission channel. Allowing all data users to transmit continuously would either require the addition of resources, with corresponding expense, or would interfere with the transmission ability of voice users. Such a circumstance would disadvantage voice users without presenting data users with a corresponding advantage. Moreover, the power consumed by a user transmitting at a fixed rate is inversely proportional to the instantaneous channel gain experienced by that user. Allowing a data user to transmit in circumstances where the data user experienced an insufficient gain would cause the user to consume excessive power. Most wireless network users depend on batteries for power, so excessive consumption resulting from transmission under circumstances providing insufficient gain would waste the user's battery power.

There exists, therefore, a need for a system that will provide a constant transmission rate to voice users while allowing access by data users in a way that maximizes average data throughput and efficiency of power consumption by the data users while minimizing the negative impact of data communication on voice users.

SUMMARY OF THE INVENTION

A system according to an aspect of the present invention comprises a wireless communication system employing a base station serving a plurality of handsets, each handset being operated by a user. At any particular time, some of the users are employing the handsets to engage in voice transmission, while others of the users are employing the handsets to engage in data transmission. The base station accommodates continuous transmission by all voice users while allocating usage among data users based on the gain experienced by the data users, while preventing transmission by any data user if the channel does not provide a predetermined gain to that data user. The transmission channel is divided into a number of time slots, with one data user being allowed to transmit during each time slot. In order to determine which data user will be allowed to transmit in a particular time slot, the conditions experienced by each user, including the gain experienced by a user, is evaluated with respect to each user. The evaluation of the gain is instantaneous, that is, the gain is evaluated at the time at which transmission is to occur and is not averaged. If it is desired to achieve maximum average throughput, the user capable of experiencing the highest gain is selected as a candidate for transmission.

Alternative techniques for determining priority are also possible, for example assigning priority to a user who is not achieving the highest gain but who has not transmitted for a significant period or who has not been allowed at least a predetermined transmission time over a period under consideration. Another alternative is to allow transmission by a user whose instantaneous gain to the highest gain achievable by that user is greatest, even if the absolute channel gain by that user is not the highest of all users. Whichever technique is used to select a candidate for transmission, the gain experienced by the candidate is compared against a gain threshold chosen to assure all data users a minimum gain. The threshold value is chosen given expected power constraints and peak power limitations. The threshold value may be chosen based on the design and expected usage of the system and the demands expected to be presented by the voice and data users. The threshold value may be changed in order to adapt to changing conditions in the system, for example, a reduction in usage during off peak hours. Changes may be determined by collecting statistical information relating to the operation of the system and adjusting the threshold when the collected information indicates significant changes in operating conditions. If the gain experienced by the candidate meets the threshold, the candidate is allowed to transmit at a power level inversely proportional to the experienced gain. If the gain experienced by the candidate does not meet the threshold, the candidate is inhibited from transmission. The threshold may suitably be set based on the expected behavior of the system, that is, the future channel gains of the users as well as the respective numbers of voice and data users.

If the candidate is not allowed to transmit, and the priority allocation method is such that the user with the highest gain is not always selected as the candidate, a search is made through the other users, in order of descending priority, to determine if there is a user whose gain meets the threshold. If such a user exists, that user is allowed to transmit.

A more complete understanding of the present invention, as well as further features and advantages of the invention, will be apparent from the following Detailed Description and the accompanying drawings.

DETAILED DESCRIPTION

Figure 1:
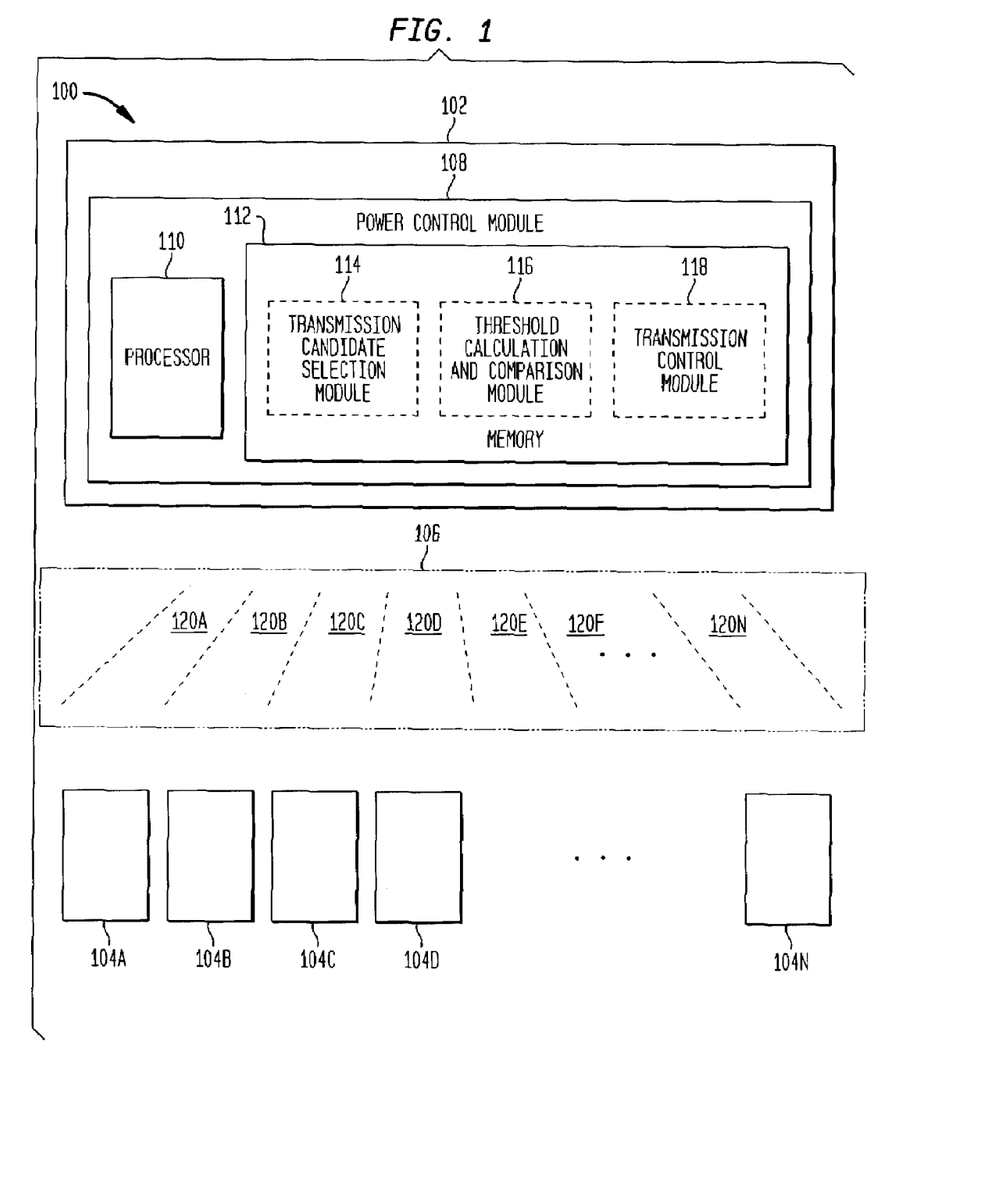
FIG. 1 illustrates a wireless communication system according to an aspect of the present invention.

A wireless communication system 100 according to an aspect of the present invention includes a base station 102 and a plurality of handsets 104A . . . 104N, each handset typically being employed by a user to engage in communication. It will be recognized that the wireless system 100 may suitably comprise more than a single base station, each serving a plurality of users, but only one base station 102 is shown here, in order to achieve simplicity of illustration and explanation. Each of the handsets 104A . . . 104N may perform voice or data communication as selected by a user. For the purposes of this discussion, the handsets 104A-104C will be assumed to be engaged in data communication, while the remaining handsets 104D . . . 104N will be assumed to be engaged in voice communication. It will be recognized, however, that any of the handsets 104A . . . 104N may engage in voice or data communication as selected by a user.

The base station 102 and the handsets 104A . . . 104N communicate over an uplink channel 106 defined by the design and programming of the base station 102 and handsets 104A . . . 104N. The channel may suitably be a discrete-time, multi-access, flat fading, additive white Gaussian noise channel, and the noise variance of the channel 106 will be herein denoted as $\sigma^2$.

The base station 102 includes a power control module 108, operative to evaluate the quality of the channel 106 and to control transmission by the handsets 104A . . . 104N. The power control module 108 includes a processor 110 and memory 112. The power control module 108 also hosts a transmission candidate selection module 114, a threshold calculation and comparison module 116 and a transmission control module 118. The modules 114-118 are preferably implemented as software applications residing in the memory 112 and executed by the processor 110.

The transmission control module 118 divides the channel 106 into a plurality of time divisions 120A . . . 120N. The transmission control module 118 allows transmission by all the handsets engaging in voice communication during all the time divisions 120A . . . 120N. In the present exemplary embodiment, the handsets engaging in voice communication and therefore allowed to transmit during all of the time divisions 120A . . . 120N are the handsets 104D . . . 104N.

The transmission control module 118 does not allow more than one of the handsets engaging in data communication, in this case the handsets 104A-104C, to transmit during a particular one of the time intervals 120A . . . 120N. Moreover, under some circumstances the power control module 108 does not allow any of the handsets 104A-104C to transmit during a time interval. Which of the handsets 104A-104C is allowed to transmit, and whether any of the handsets 104A-104C is allowed to transmit, is determined by the power control module 108 depending on the condition of the channel 106 as experienced by the handsets 104A-104C.

The transmission candidate selection module 114 evaluates the channel gain experienced by each of the handsets 104A-104C and selects the handset experiencing the best channel gain as a candidate for transmission. However, before the selected handset is allowed to transmit, the threshold calculation and comparison module 116 further evaluates the gain against a threshold chosen to maximize the data throughput by preventing data users from interfering with voice users when the data users would not experience sufficient benefit to make the interference worthwhile. The threshold may suitably be set based on the expected conditions of the channel 106, and may suitably take into account the number of active handsets 104A . . . 104N, the average and peak power constraints of each of the handsets 104A . . . 104N and a mobility model used to predict the present and expected locations or ranges of the handsets 104A . . . 104N.

The threshold preferably changes relatively slowly, if at all, because the overall conditions prevailing in the system 100, that is, the number and power requirements of the total number of users in the system, can be expected to change relatively slowly. The threshold need not be set at the beginning of each time slot. The threshold may be static, based on the expectation that the average conditions prevailing in the system 100 will be relatively constant. Even if a single user begins or ceases communication, the overall number of users will not change very quickly, because new users will begin communicating as other users cease communicating. If desired, the system 100 may be designed so that the threshold changes based on information collected over a period of time, for example 30 minutes or more, in order to update the threshold in case system conditions actually change. Alternatively, the threshold may be changed depending on the time of day, for example, to reflect the expectation that more users will be present during peak hours.

It will be recognized that selection of the data user experiencing the best gain is not the only way to determine user priority. Selection of the user with the best gain in every case will achieve the greatest average throughput for data users, but may in some circumstances cause an excessive delay for other users if a long period elapses in which they are not selected for transmission because they do not experience the best channel gain. Other recognized techniques exist for assigning priority among users, for example giving each user an equal share of the time slots, weighing the gain experienced by each user against the time since each user was last allowed to transmit and striking a balance in order to assign priority, or choosing the user with the largest relative channel gain. The relative channel gain is the actual gain experienced by a user relative to the average or the maximum values of the channel gain for that user, where the average and the maximum values are computed over a suitable time window.

No matter which technique is used to assign priority, the gain experienced by the user who has been selected as a candidate for transmission is compared to the threshold. If the gain experienced by the user does not meet the threshold, the user is not allowed to transmit. In cases in which the user with the best gain is not selected as a candidate, and the user selected as a candidate does not experience sufficient gain to allow transmission, other users who were not initially selected may be experiencing gains above the threshold. In that case, the transmission candidate selection module 114 may suitably select different candidates for transmission until one is found who meets the threshold and can be allowed to transmit.

Once a candidate has been selected and it has been determined that the selected candidate is experiencing a gain above the threshold, the transmission control module 118 allows the candidate to transmit. The transmission control module 118 employs channel inversion in order to set the power at which the selected candidate is allowed to transmit. That is, the selected candidate is allowed to transmit at a power inversely proportional to the gain it is experiencing. The use of channel inversion insures that the power received at the base station 102 from each of the voice handsets 104D . . . 104N will be the same. The use of channel inversion also insures that the same power will be received from one of the data handsets 104A-104C whenever one of the handsets 104A-104C is allowed to transmit, independently of which user is selected at any particular time. Setting the power received from a data handset insures that the same data transmission rate will be experienced by the handset, regardless of the channel gain experienced by the selected handset and regardless of which handset is selected.

Figure 2:
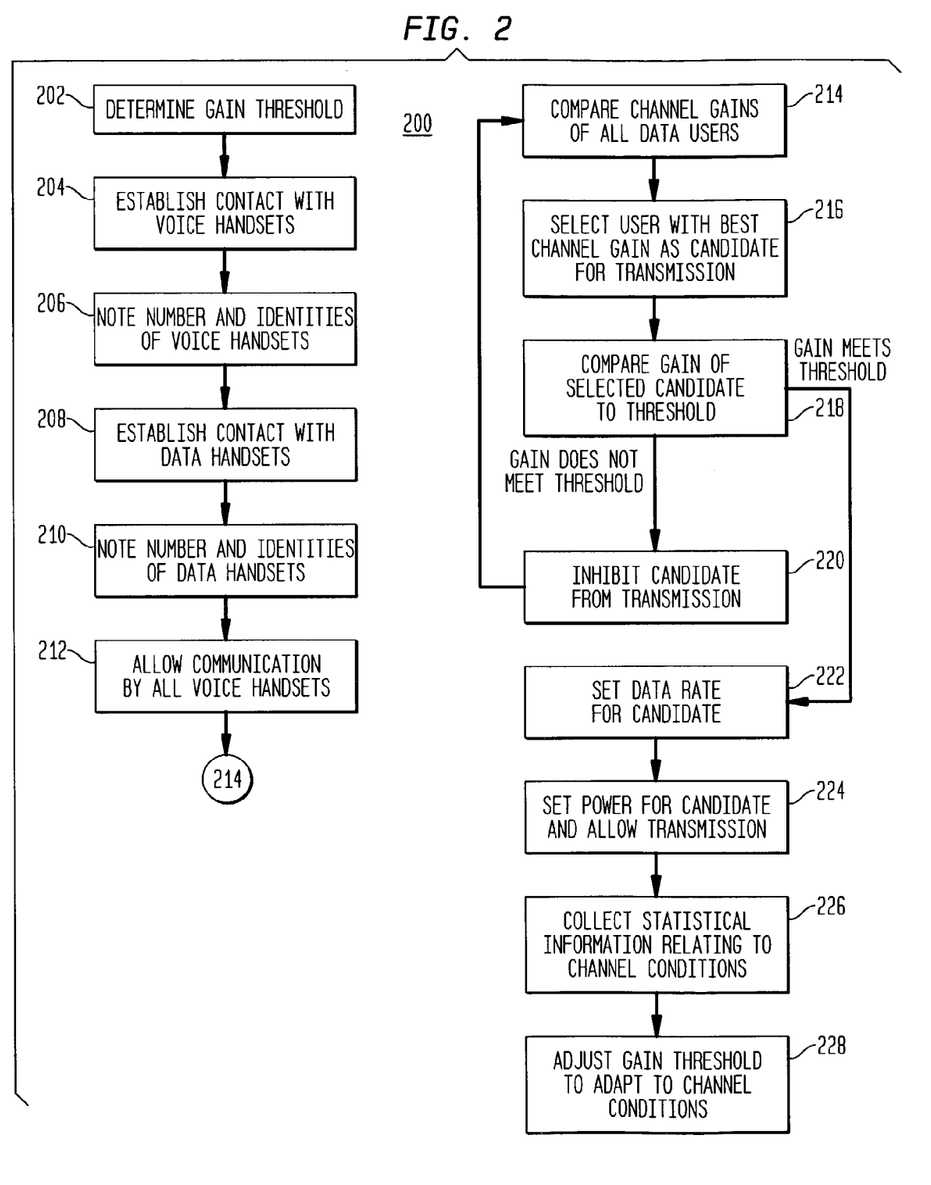
FIG. 2 illustrates a process of wireless communication control according to an aspect of the present invention.

FIG. 2 illustrates the steps of a process 200 of communication control according to the present invention. The process 200 may suitably be employed by a wireless communication system similar to the system 100 to carry out integrated data and voice communication and to regulate system access by data users such as the users employing the handsets 104A-104C. At step 202, a gain threshold for allowing transmission by a data user is determined. The gain threshold is preferably set based on conditions expected to prevail or actually prevailing in the system and may suitably be determined based on the number of users, the average and peak power constraints of each user and a mobility model of each user. The factors to be taken into account and the computations to be made in determining the gain threshold are discussed in greater detail below. The gain threshold preferably changes not at all or else relatively slowly, depending on the particular design choices made for the system. At step 204, initial contact is established between a base station and a plurality of handsets employed by users engaging in voice communication over a wireless channel. At step 206, the number and identities of the voice handsets are noted, in order to provide for proper routing of communication. At step 208, initial contact is established with a plurality of handsets engaging in data communication. At step 210, the number and identities of the data handsets are noted, in order to allow for control of communication by the data handsets.

At step 212, communication is allowed by all voice handsets. The channel is divided into a plurality of time slots, with each transmission being allowed by all voice users during each time slot.

The following steps 214-224 relate to selecting a data user for transmission and setting the data rate for the selected user. The steps 214-224 are repeated for each time slot.

At step 214, the instantaneous channel gains of all data handsets are compared. At step 216, the data handset with the best channel gain is selected as a candidate for transmission. At step 218, the instantaneous channel gain of the selected data handset is compared to the gain threshold. If the gain for the selected data handset is below the gain threshold, the process proceeds to step 220 and the selected data handset is inhibited from transmission, suitably by setting a transmission rate of zero for the handset. The process then returns to step 214. If the gain experienced by the selected data handset is at or above the gain threshold, the process proceeds to step 222, a transmission rate is set for the selected data handset. The transmission rate is preferably constant, allowing the selected data user to transmit at a constant rate during the entire time slot. At step 224, the selected data user is allowed to transmit at a power that will yield the desired rate, the power being determined based on the gain experienced by the user and a parameter determined based on the number of users and their respective power constraints. The power level is preferably inversely proportional to the gain experienced by the handset.

At step 226, statistical information is collected relating to the conditions prevailing in the wireless communication channel. At step 228, the gain threshold is adjusted to adapt to changes in the wireless communication channel. Steps 226 and 228 are optional and, if performed, are not performed at every time slot. Step 228, in particular, is performed relatively infrequently, because changes in the overall condition of the wireless communication channel will typically occur relatively slowly. The overall condition of the channel reflects the average activity of all users. The status and activities of the users as a group will typically change relatively slowly. Even if individual users make substantial changes in their activities, for example ending a communication, other users will make offsetting changes in their activities, for example beginning a communication.

The gain threshold value for determining whether or not any of the data users will be allowed to transmit is determined based on the expected behavior of the channel, the number of voice and data users, the rates at which it is desired to allow voice and data users to transmit and average and peak power constraints of voice and data users. Various assumptions and calculations used in determining the gain threshold are discussed below. The assumptions and calculations discussed below are applicable in the case where priority is assigned by selecting the data user experiencing the highest channel gain.

The channel may suitably be modeled by the following equation in which the terms represent the voice user signals, the data user signals and noise, respectively:

$$Y[n] = \sum_{i=1}^{N_v} \sqrt{g_{v,i}[n]}\, X_{v,i}[n] + \sum_{i=1}^{N_d} \sqrt{g_{d,i}[n]}\, X_{d,i}[n] + Z[n]. \qquad (1)$$

The variable $g_{v,i}$ designates the instantaneous gain experienced by voice user i and the variable $g_{d,i}$ designates the instantaneous gain experienced by data user i. The probability density function of the channel gain may be denoted by $f_G(g)$ and the distribution function may be denoted by $F_G(g)$. For the sake of simplicity of explanation, it is assumed herein that the users are symmetric and that the channel gains of all the users are independent and identically distributed and take on values in the continuous set G. If the probabilistic behavior is not known a priori, it may be determined through the use of universal power control techniques.

The constant transmission rate of the voice users may be denoted by $R_v$. For a given bit error probability, the signal to interference plus noise ratio (SINR) for a voice user must exceed a threshold $$\gamma_v = \frac{E_b}{N_0} \cdot \frac{R_v}{W}.$$

The value of $$\frac{E_b}{N_0}$$

depends on the particular encoding, decoding and modulation schemes that are used, as well as the desired error probability. For the sake of simplicity, this value is assumed to be fixed and the same for all voice users. The value W denotes the total system bandwidth, expressed in Hz. Moreover, also for the sake of simplicity, it is assumed that no interference cancellation is employed by the base station. If no interference cancellation is employed, every voice and data user must overcome the interference presented by all other active users. In particular, the voice users need to overcome interference from the transmitting data user, if any and the transmitting data user must overcome the interference from all voice users. The values $\overline{P_v}$ and $\overline{P_d}$ denote the expected average power of the voice and data users, respectively. Similarly, the values $P_{v,max}$ and $P_{d,max}$ denote their peak power constraints.

The power at which the selected data user is allowed to transmit, when the threshold is such that transmission is allowed, is $$P_{d,k} = \frac{\alpha}{g_{d,k}}. \quad (2)$$

The parameter $\alpha$ is determined based on the number of users and their respective power constraints.

It is desired to set the gain threshold in order to make efficient use of the available power resources to maximize the throughput of the data users in the presence of interfering voice users. It can be noted that the data rate is related to the SINR by Shannon's classical formula $$R_{d,k} = \frac{1}{2} \log \left\{ 1 + \frac{g_{d,k} P_{d,k}}{\sum_{j=1}^{N_v} g_{v,j} P_{v,j} + \sigma^2} \right\} b/s/Hz. \quad (3)$$

Because data users may have high transmission rates, equation (3) does not represent a linear approximation between rate and transmit power. In practice, transmission rates very close to the maximum rate represented by equation (3) may be achieved if turbo codes or low density parity check codes are employed.

At a given time slot, all voice users transmit at power $P_{v,t}$ in order to achieve their threshold SINR at the receiver. The SINR is represented by $$\gamma_v = \frac{g_{v,i} P_{v,i}}{\sum_{\substack{j=1 \\ j \neq i}}^{N_v} g_{v,j} P_{v,j} + g_{d,k} P_{d,k} + \sigma^2} \quad (4)$$

where k is the index of the transmitting data user, if any. Solving this system of $N_v$ equations for $P_{v,i}$, where $P_{v,i}$ represents the transmit powers of the voice users in the presence of an interfering data user, yields $$P_{v,i} = \frac{1}{g_{v,i}} \frac{\gamma_v (g_{d,k} P_{d,k} + \sigma^2)}{1 - (N_v - 1)\gamma_v}. \quad (5)$$

In the absence of data users, the transmit power is given by $$P_{v,i} = \frac{1}{g_{v,i}} \frac{\gamma_v \sigma^2}{1 - (N_v - 1)\gamma_v}. \quad (6)$$

It can be noted that for a given multiple of channel gains, for example the channel gains experienced by all voice users at a particular time step, the effective power from each voice user received at the base station is the same as the effective power from each of the other voice users as it is received at the base station. However, the addition or removal of an interfering data user may cause the power received from each voice user to change over time, even though the power from each voice user is identical to that received from the other voice users. For example, the effective power received from each voice user may be 100 mW in the absence of a data user. If a data user is added, the power received from each voice user may be 120 mW. The transmission rate of a voice user is constant at $R_v$. In the presence of a transmitting data user, the total received power at the base station is larger due to the added interference. In order for the voice user to continue transmission at the same rate, the transmission power for the voice user must be increased to overcome this added interference. This increased transmission power leads to a larger received power at the base station, for the voice user in question.

In addition, the received power of the data user need not be the same as the received power of the voice users. For example, the effective power from each voice user may be 120 mW while the effective power from a data user may be 200 mW.

For simplicity of exposition, the data users are assumed to be homogeneous. Under this assumption, the probability that the voice users do not experience any interference from the data users is the probability that no data user transmits and is expressed by $\Pi_{-i} = [F_G(g^*)]^{N_d}$, where $g^*$ is the gain threshold used to determine whether a data user is to be allowed to transmit. Conversely, the probability that the voice users encounter interference from the data users is given by $\Pi_l 1 = 1 - [F_G(g^*)]^{N_d}$. Because all the data users are symmetric, the probability that a given data user, for example user k, transmits is given by $$\pi_k = \frac{1}{N_d}[1 - [F_G(g^*)]^{N_d}].$$

Using the expressions in equations (5) and (6) to distinguish whether interference from the data users is present or not yields the following equation for the average transmit power of a voice user:

$$E[P_v] = \frac{\gamma_v \{\alpha \lfloor 1 - [F_G(g^*)]^{N_d} \rfloor + \sigma^2\}}{1 - (N_v - 1)\gamma_v} E\left[\frac{1}{g_v}\right] \leq \overline{P}_v. \quad (7)$$

The expected transmit power of a data user is computed in a similar fashion as $$E[P_d] = \int_{g_d \geq g} \cdot \frac{\alpha}{g_d} f_G(g_d)[F_G(g_d)]^{N_d - 1} dg_d \leq \overline{P}_d. \quad (8)$$

The expected rate of transmission, or throughput, of data user k is then given by $$E[R_{d,k}] = \frac{1}{2N_d}[1 - [F_g(g^*)]^{N_d}]\log\{1 + r\}, \quad (9)$$

where r is the received SINR of a transmitting data user, that is, $$r = \frac{g_{d,k} P_{d,k}}{\sum_{j=1}^{N_v} g_{v,j} P_{v,j} + \sigma^2} = \frac{\alpha}{\frac{N_v \gamma_v (\alpha + \sigma^2)}{1 - (N_v - 1)\gamma_v} + \sigma^2}. \quad (10)$$

In addition to analyzing the data throughput with respect to the expected power constraints of voice and data users, it is also necessary to take into account the peak power limitations of each user. If $g_{min}$ is the minimum value of $g \in G$, the maximum power of a voice user is given by $$\max\{P_v\} = \frac{\gamma_v[\alpha + \sigma^2]}{[1 - (N_v - 1)\gamma_v]g_{min}} \leq P_{v,max} \quad (11)$$

The maximum power of a data user is given by $$\max\{P_d\} = \frac{\alpha}{g^*} \leq P_{d,max}. \quad (12)$$

Power and rate control is parameterized by the gain threshold g*, and the data throughput is a function of the threshold g* and the parameter $\alpha$. The parameter $\alpha$, it will be remembered, is determined based on the number of users and the power constraints. The expected and peak power constraints impose bounds on $\alpha$. If the number of voice and data users is fixed, then for a given threshold g*, the value r, that is, the SINR of a transmitting user, is an increasing function of $\alpha$. Since the throughput is an increasing function of r, it is also an increasing function of $\alpha$. It is therefore desired that $\alpha$ be as large as possible. However, the maximum value which $\alpha$ can achieve is constrained by the peak and average power constraints. Therefore the maximizing parameter $\alpha$ is the minimum of $\alpha_1$, $\alpha_2$, $\alpha_3$ and $\alpha_4$, where $$\alpha_1 = \frac{\overline{P}_d}{\int_{g_d \geq g^*} \frac{1}{g_d} f_G(g_d)[F_G(g_d)]^{N_d - 1} dg_d}$$

$$\alpha_2 = \frac{1}{1 - [F_G(g^*)^{N_d}]} \left\{ \frac{\overline{P}_v[1 - (N_v - 1)\gamma_v]}{\gamma_v E\left[\frac{1}{g_v}\right]} - \sigma^2 \right\}$$

$$\alpha_3 = \frac{1 - (N_v - 1)\gamma_v}{\gamma_v}[g_{min} P_{v,max}] - \sigma^2$$

$$\alpha_4 = g^* P_{d,max}$$

with $\alpha_1$ based on the expected power for a data user, $\alpha_2$ based on the expected power for a voice user, $\alpha_3$ based on the peak power for a voice user and $\alpha_4$ based on the peak power for a data user. The smallest of these values constrains the data transfer rate and is used as the parameter $\alpha$, for example in the equations (9) and (10) above. That is, the minimum value of $\alpha_1$, $\alpha_2$, $\alpha_3$ and $\alpha_4$ is substituted for the parameter a in equation (10), which provides the value of r, the SINR for a user. The value for r provided by equation (10) is substituted into equation (9) to yield an expression for the expected throughput for the data user. Equation (9), again, is $$E[R_{d,k}] = \frac{1}{2N_d}[1 - [F_G(g^*)]^{N_d}]\log\{1 + r\}. \quad (9)$$

The values $R_{d,k}$, $N_d$ are known from initial assumptions or calculations and the value of r is known from equation (10) based on the selected value of $\alpha$. The nature of the function $F_G(\cdot)$ is known based on the distribution model of the communication system. Therefore, in order to establish the threshold g*, a value is chosen for $g^* \in G$ that maximizes the value of $E\lfloor R_{d,k} \rfloor$ given by equation (9). This value may suitably be determined by numerical optimization. The optimal value of the parameter a may also be substituted in equation (5) to give the transmit power of the voice users in the presence of an interfering data user.

As noted above, above equations are applicable in the case where priority is assigned by selecting the data user experiencing the highest channel gain. In cases where other criteria are used to assign priority, for example assigning an equal share of the time slots to each user or selecting the user with the best relative channel gain, the threshold will be computed using equations applicable to the criteria used to assign priority and chosen such that neither the voice users nor the data users violate average and peak power constraints.

FIGS. 3-9 below illustrate numerical results for a system similar to the system 100, in the case where the users are uniformly distributed on a linear network. For simplicity, it is assumed that there is one base station and that the users are located in the interval [0,D]. The density of the user location is then given by $$f_X(x) = \frac{1}{D} \text{ if } x \in [0, D]$$

where x denotes the distance of the user to the base station, assumed to be located at 0. The distribution function is then given as $$F_X(x) = Pr(X \le x) = 1 - \frac{x}{D}.$$

Finally, it is assumed that the channel gain between the user and the base station is inversely proportional to a power of the distance, with path loss coefficient a. The numerical values used in the present illustrative case are $R_v$=9600 bps, $\overline{P}_v = \overline{P}_d$=125 mW, $P_{v,max} = P_{d,max}$=600 mW and $\sigma^2 = 10^{-12}$ W. The maximum distance D from the base station to a user is assumed to be 1500 m, and the path loss coefficient a is assumed to be 4. The required value $$\frac{E_b}{N_0}$$

for voice users is set to 5 dB, leading to a value for $\gamma_v$ of 0.0242.

Figure 3:
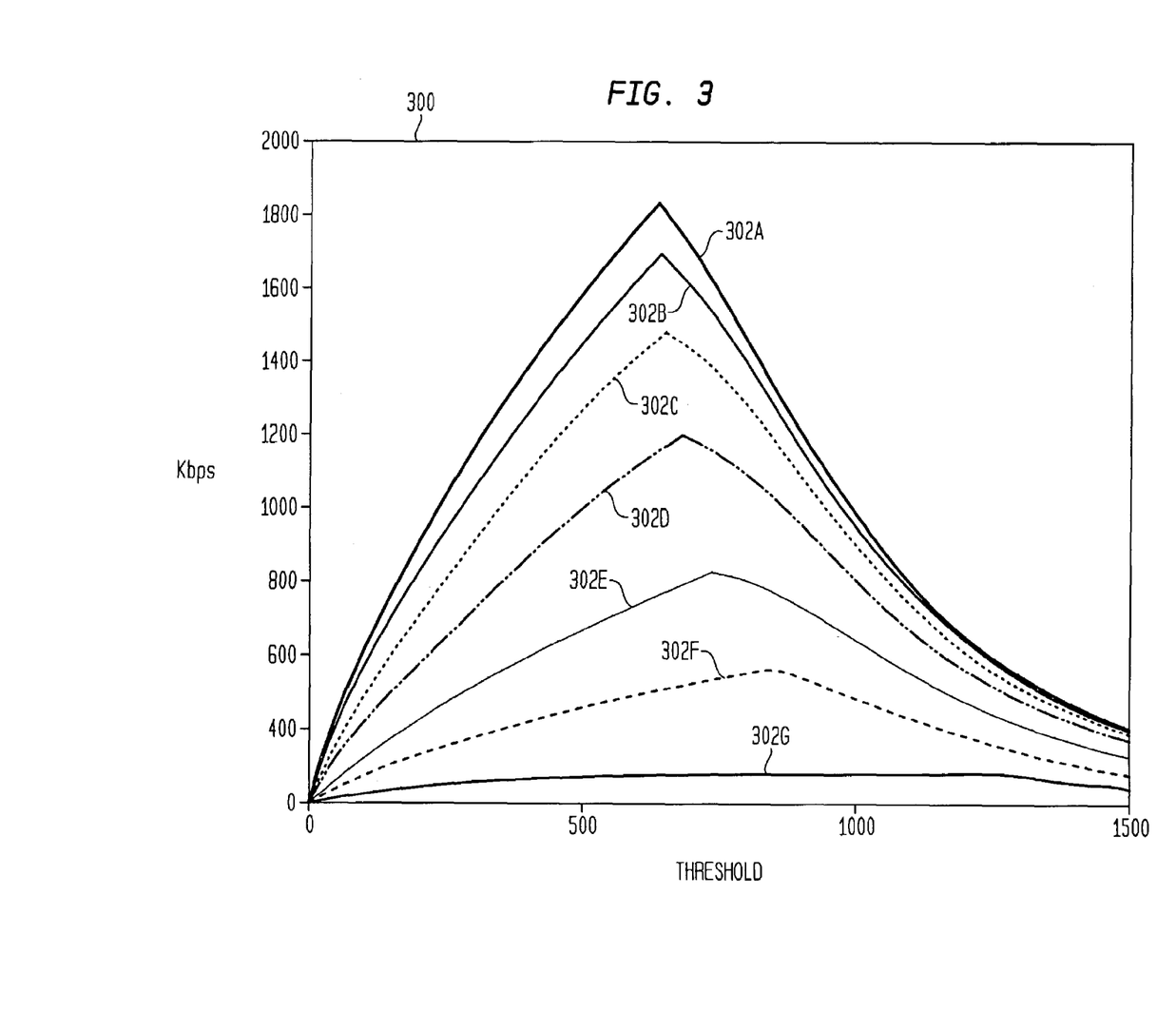
FIG. 3 illustrates the throughput of a single data user as a function of a transmission threshold applied according to the present invention.

FIG. 3 illustrates a graph 300 showing the influence of the threshold on the expected rate of the data user. For simplicity, it is assumed that only one data user is present. The graph 300 includes a family of curves 302A-302G, plotting the data rate against the distance from the base station for a single data user in the presence of 1, 2, 4, 8, 16, 24 and 32 voice users, respectively. The gain threshold g* is inversely proportional to a power of the distance between the user and the base station. Therefore, a lower gain threshold allows transmission at a greater distance and a higher gain threshold allows transmission only at a shorter distance. The distance ranges from 0 to 1500 m, and it can be seen that the transfer rate is maximized by setting the threshold significantly higher than a threshold that would simply allow transmission at the greatest possible distance. If the optimal threshold is chosen, the increase in data throughput ranges from 83% to 695% over the throughput achieved by simply allowing transmission at the maximum possible distance, as the number of voice users changes from 1 to 32.

Modifying the circumstances described above to include the presence of 2 or 3 data users, the conditions illustrated in FIG. 3 and described above continue to prevail. That is, the throughput per user is highest when the threshold is at some point between 0 and a threshold allowing transmission at a distance of 1500 m. Data throughput in the case where the threshold is at an optimum value significantly greater than a threshold set to allow a user to transmit at maximum range, in this case 1500 m, or D.

However, when the number of data users is 4 or more, the data throughput per user is a strictly increasing function of the threshold. That is, the data throughput increases as the threshold is set to values allowing transmission at greater and greater ranges.

Figure 4:
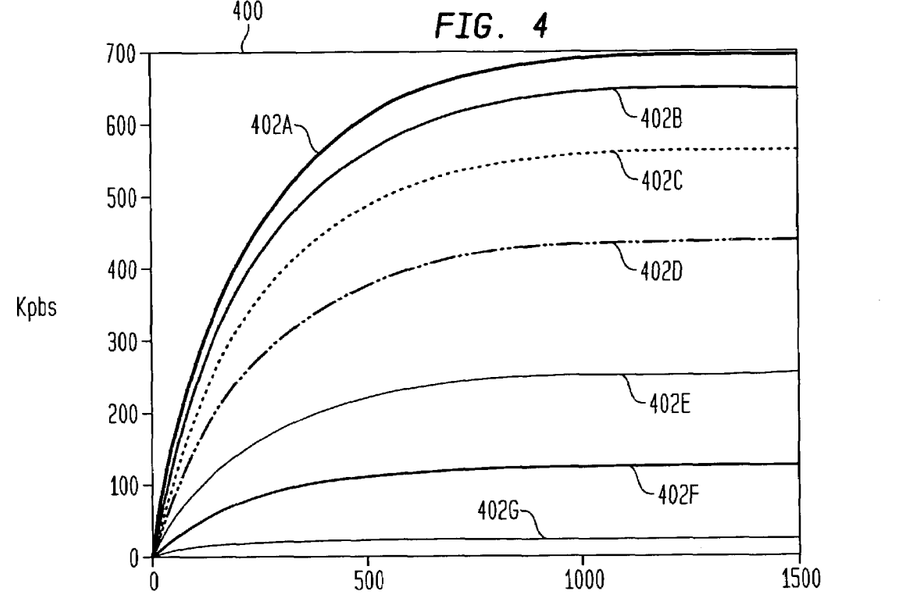
FIG. 4 illustrates the throughput per data user in an environment with four data users as a function of a transmission threshold applied according to the present invention.

FIG. 4 shows a graph 400 illustrating data throughput per user as a function of threshold, where the number of data users is 4. The graph 400 includes a family of curves 402A-402G, representing the presence of 1, 2, 4, 8, 16, 24 and 32 voice users, respectively. It can be seen that all the curves 402A-402G undergo an early rapid rise, that the rate of the rise progressively slows and that eventually the rate of increase for each curve becomes very slow as the range allowed by the threshold increases. It can be seen, therefore, that setting the threshold to a value allowing significantly less than the maximum range may cause only a slight degradation in throughput. As will be seen in greater detail below, setting a threshold so that a lower range is allowed may provide significant benefits in the presence of additional constraints such as peak power constraints. Peak power constraints impose a limit on cell size, that is, the maximum area served by a single base station and therefore the distance at which users may be located. Achieving high throughputs at relatively small ranges may be desirable because a high throughput may be provided in the case where peak power constraints define a relatively small cell.

Figure 5:
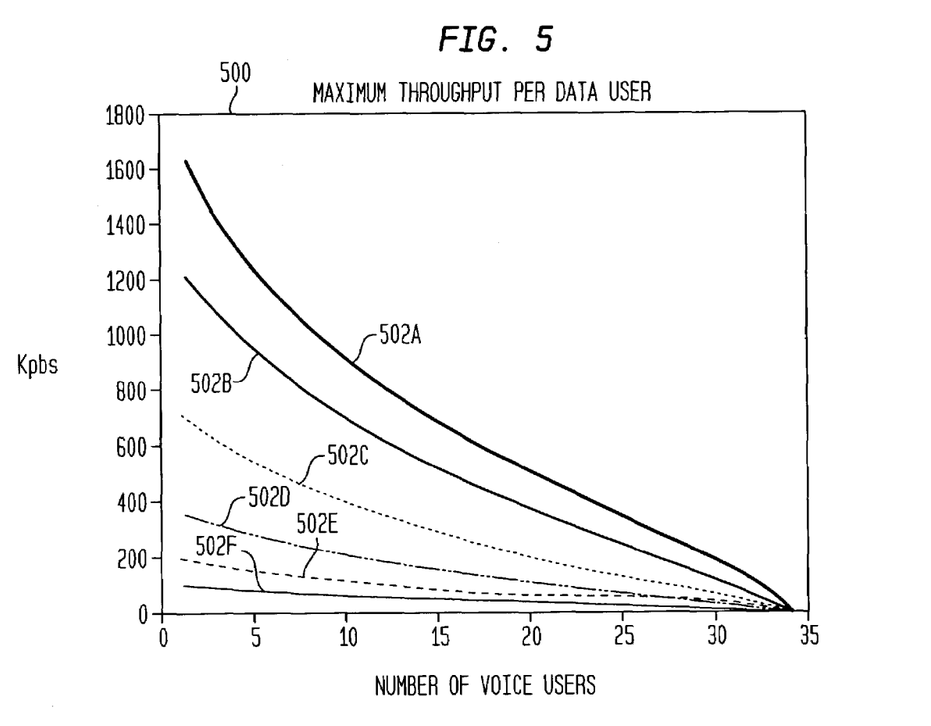
FIG. 5 illustrates the maximum throughput per data user as a function the number of voice users in a system according to the present invention.

FIG. 5 illustrates a graph 500 showing the maximum throughput per data user as a function of the number of voice users in a system operating under the assumptions described above. The graph 500 includes a family of curves 502A-502F, showing the throughput per data user as a function of the number of voice users, in the presence of 1, 2, 4, 8, 16 and 32 data users, respectively. The throughput is a decreasing function of the number of voice users and the number of data users.

Figure 6:
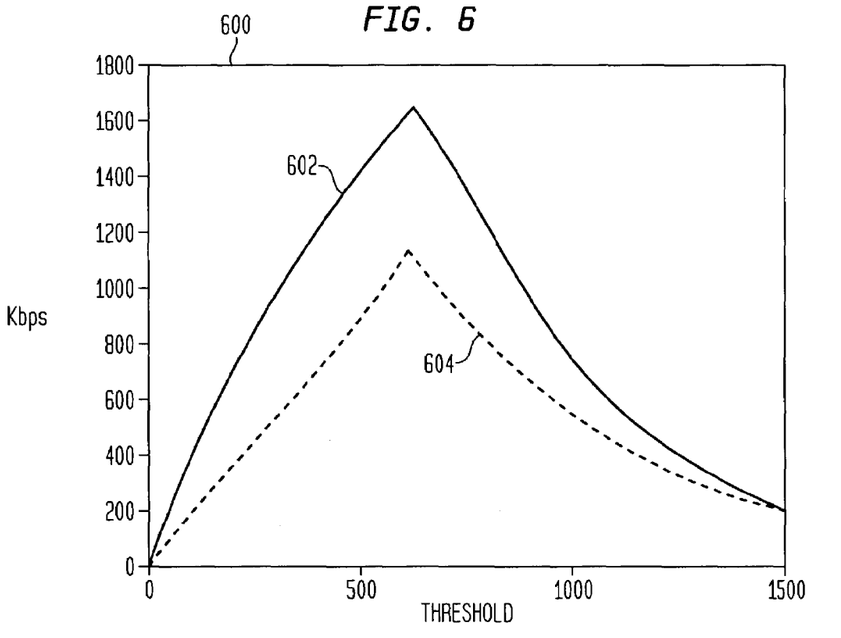
FIG. 6 illustrates the throughput of a single data user as a function of a transmission threshold applied according to the present invention, in the presence and absence of a peak power constraint, in an environment with one data user and one voice user.

FIG. 6 illustrates a graph 600 showing the throughput of a single user as a function of threshold with and without a peak power constraint, in the presence of a single voice user. The curve 602 illustrates the relationship between threshold and throughput in the absence of the constraint and the curve 604 illustrates the relationship between threshold and throughput in the presence of the constraint. In this case, the curves 602 and 604 exhibit similar behavior, and behavior similar to that of the curves 302A=302G of FIG. 3. That is, the optimum threshold yields a range significantly below the maximum range. In addition, it can be seen that the presence of a peak power constraint significantly decreases the maximum throughput.

Figure 7:
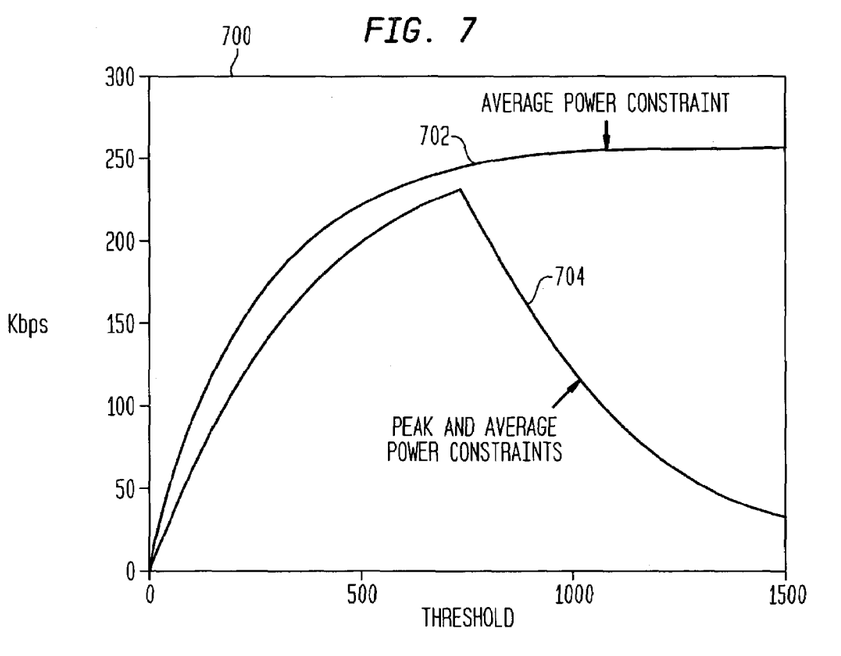
FIG. 7 illustrates the throughput per data user as a function of a transmission threshold applied according to the present invention, in the presence and absence of a peak power constraint, in an environment with four data users and 16 voice users.

FIG. 7 shows a graph 700 illustrating the throughput per data user as a function of the threshold, in the presence of four data users and 16 voice users, with and without a peak power constraint. The curve 702 illustrates the relationship between threshold and throughput in the absence of the constraint and the curve 704 illustrates the relationship between threshold and throughput in the presence of the constraint. It can be seen that in the absence of a peak power constraint, maximum throughput occurs at the threshold providing maximum range. In the presence of a peak power constraint, an optimum threshold exists that provides a range significantly below the maximum. At the optimum threshold, the throughput is significantly above the throughput provided by a threshold yielding maximum range, and the throughput is nearly as great as would exist in the absence of a peak power constraint. In the presence of four data users, the degradation in throughput imposed by the peak power constraint is approximately 9.25%, and the degradation caused by the peak power constraint decreases even further, if an optimum threshold is used, as the number of data users increases.

Figure 8:
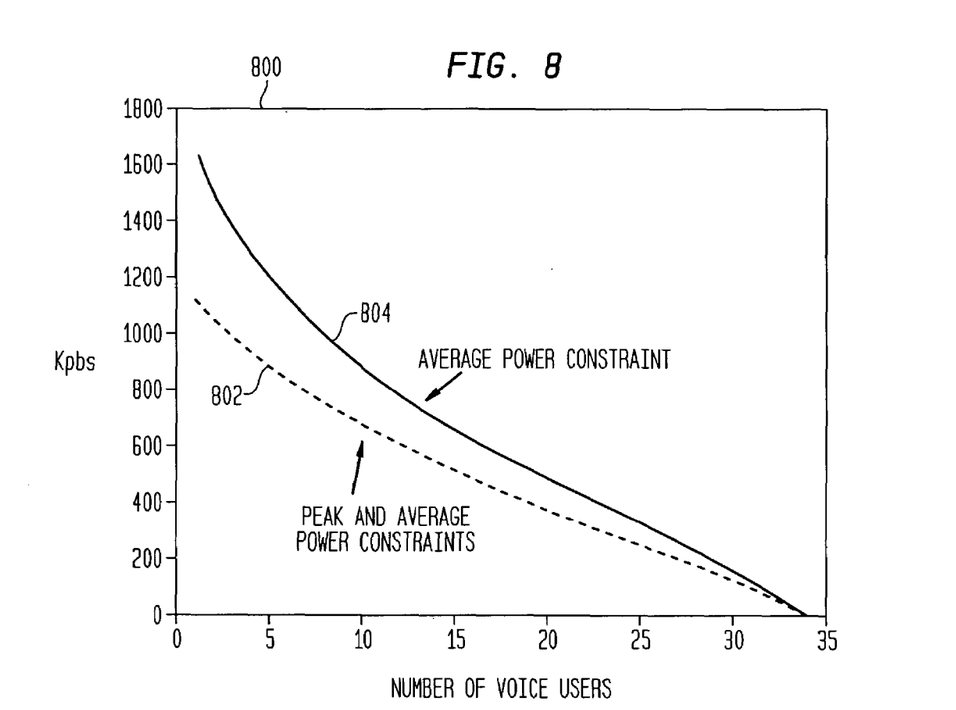
FIG. 8 illustrates the maximum throughput of a single data user as a function of the number of voice users in a system according to the present invention, in the presence and absence of a peak power constraint.

FIG. 8 shows a graph 800 illustrating the maximum throughput of a single data user as a function of the number of voice users, with and without peak power constraints.

FIG. 8 includes the curve 802, representing the absence of a peak power constraint, and the curve 804, representing the presence of a peak power constraint. It can be seen that the peak power constraint imposes a significant degradation in throughput, especially when the number of voice users is small. However, it can also be seen that significant transmission rates are achievable.

Figure 9:
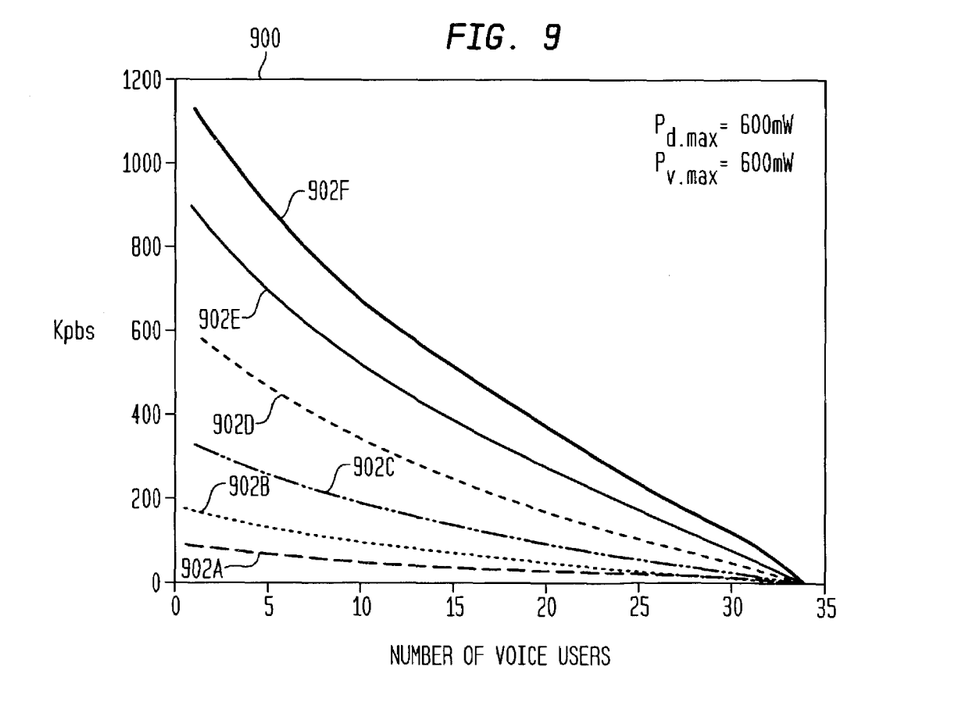
FIG. 9 illustrates the maximum throughput per data user as a function of the number of voice users in a system according to the present invention, in the presence of various numbers of data users.

FIG. 9 shows a graph 900 illustrating the maximum throughput for a data user as a function of the number of voice users, in the presence of a peak power constraint and in the presence of increasing numbers of data users. The graph 900 illustrates the curves 902A-902F, representing the presence of 1, 2, 4, 8, 16 and 32 data users, respectively. It can be seen that the presence of the peak power constraint significantly reduces data throughput.

While the present invention is disclosed in the context of a presently preferred embodiment, it will be recognized that a wide variety of implementations may be employed by persons of ordinary skill in the art consistent with the above discussion and the claims which follow below.

I claim:

1. A controller for a wireless communication system for conducting and managing simultaneous communication of voice and data over a wireless communication channel by selectively assigning transmission slots to a plurality of potential voice and data users, the controller comprising:
   a processor; and
   a memory for storing software which governs operation of the processor,
   the processor, memory and software cooperating to control transmission by the potential voice and data users by determining a channel gain for each potential data user, comparing the channel gain to a gain threshold established to prevent data users from interfering with voice users when the data users would not experience sufficient benefit, and selecting a potential data user for transmission only when the channel gain experienced by the potential data user exceeds the gain threshold.

2. The system of claim 1 wherein the controller directs transmission by a potential data user selected for transmission by setting a transmission power level for the potential data user selected for transmission allowing transmission at a nonzero rate, the transmission power level being inversely proportional to the gain experienced by the potential data user selected for transmission.

3. The system of claim 2 wherein the controller sets a power level for each user that is permitted to transmit such that approximately equal power is received by the base station from every voice user and approximately equal power is received by a base station from every data user that is transmitting.

4. The system of claim 3 wherein the controller divides the communication channel into a plurality of time slots and selects no more than one data user to transmit during a particular time slot.

5. The system of claim 4 wherein the controller sets a transmission power level for each data user transmitting during plurality of time slots such that the power received from a data user is approximately the same during each time slot regardless of which data user is transmitting during a particular time slot and of the channel gain experienced by a particular data user transmitting during a particular time slot.

6. The system of claim 5 wherein the controller allows transmission by all voice users during all time slots.

7. The system of claim 6 wherein the controller selects a particular data user as a candidate for transmission according to a predetermined criterion, the candidate for transmission being the particular data user best meeting the predetermined criterion.

8. The system of claim 7 wherein the controller selects as the candidate for transmission the particular data user experiencing the highest instantaneous gain.

9. The system of claim 7 wherein the controller selects as the candidate for transmission the particular data user experiencing the highest relative gain.

10. The system of claim 7 wherein the predetermined criterion for selecting the candidate for transmission is chosen so as to provide each data user with at least a guaranteed minimum transmission time.

11. The system of claim 7 wherein the controller compares the gain experienced by a first candidate for transmission against the threshold and selects another candidate for transmission if the gain experienced by the original candidate for transmission does not meet the threshold.

12. The system of claim 8 wherein each of the potential voice and data users can conduct voice or data communication.

13. A method of managing transmission of a plurality of data handsets carrying on data communication with a base station over a wireless channel and managing transmission of a plurality of voice handsets carrying on voice communication with the base station over the wireless channel, comprising the steps of:
   establishing a gain threshold for allowing communication by a data handset carrying on data communication, the gain threshold chosen to assure all data users have a minimum gain; and
   selecting a particular data handset as a candidate for transmission only if the particular data handset experiences an instantaneous gain evaluated at the time at which transmission is to occur and exceeding the gain threshold.

14. The method of claim 13, further comprising the step of directing transmission by all voice handsets.

15. The method of claim 14, wherein the step of directing transmission by all voice handset comprises setting a transmission power for each voice handset such that the power received at the base station from each handset is approximately the same.

16. The method of claim 15, wherein a single data handset is directed to transmit after the single data handset has been identified as the best candidate for transmission according to a predetermined criterion establishing priority among the data handsets experiencing an instantaneous gain exceeding the gain threshold.

17. The method of claim 16, wherein the step of selecting the single data handset comprises selecting the handset experiencing the highest instantaneous gain of the data handsets experiencing an instantaneous gain exceeding the gain threshold.

18. The method of claim 16, wherein the step of selecting the single data handset comprises selecting the handset experiencing the highest relative gain of the data handsets experiencing an instantaneous gain exceeding the gain threshold.

19. The method of claim 17, wherein the step of directing transmission by the single data handset includes setting a transmission power for the single data handset inversely proportional to the gain experienced by the single data handset.

20. The method of claim 13, further comprising periodically adjusting the gain threshold in light of changing conditions with respect to the wireless channel.

* * * * *